United States Patent [19]
Greenip, Jr. et al.

[11] Patent Number: 5,345,390
[45] Date of Patent: Sep. 6, 1994

[54] CONTROL GRAPHICS SYSTEM FOR GEAR SHAPING MACHINES

[75] Inventors: Lawrence E. Greenip, Jr.; Gregory H. Chase, both of Chester; Clarence M. Nichols, Springfield, all of Vt.

[73] Assignee: Fellows Corporation, Springfield, Vt.

[21] Appl. No.: 32,415

[22] Filed: Mar. 15, 1993

Related U.S. Application Data

[63] Continuation of Ser. No. 578,421, Sep. 4, 1990, abandoned.

[51] Int. Cl.$^5$ .................. G06F 15/46; G05B 23/02
[52] U.S. Cl. .................. 364/474.17; 364/474.19; 364/474.26; 364/508
[58] Field of Search .............. 364/474.16, 474.17, 364/474.19, 474.21, 474.02, 474.12, 474.15, 474.24, 474.26, 551.02, 507, 508; 73/104; 409/2, 15; 408/3, 10–12; 318/561, 563, 565; 377/15, 16

[56] References Cited

U.S. PATENT DOCUMENTS

| | | | |
|---|---|---|---|
| 3,834,615 | 9/1974 | Watanabe et al. | 235/151.11 |
| 4,254,690 | 3/1981 | Tlaker et al. | 91/433 |
| 4,513,366 | 4/1985 | Munekata et al. | 364/474.26 X |
| 4,564,911 | 1/1986 | Smith et al. | 364/474.17 X |
| 4,608,644 | 8/1986 | Kiya | 364/474.17 |
| 4,663,721 | 5/1987 | Herscovici | 364/474.02 |
| 4,713,770 | 12/1987 | Hayes et al. | 364/474.17 |
| 4,854,786 | 8/1989 | Alexander et al. | 364/474.17 X |
| 4,883,617 | 5/1989 | Wang | 364/474.17 X |
| 4,994,977 | 2/1991 | Tsujido | 364/474.26 X |
| 5,043,906 | 8/1991 | Jepson | 364/474.2 X |
| 5,150,305 | 9/1992 | Sekikawa | 364/474.26 |
| 5,175,688 | 12/1992 | Sasaki et al. | 364/474.26 X |

FOREIGN PATENT DOCUMENTS

| | | |
|---|---|---|
| 120974 | 10/1984 | European Pat. Off. . |
| 145934 | 6/1985 | European Pat. Off. . |
| 2827711 | 1/1979 | Fed. Rep. of Germany . |
| 3533765 | 4/1986 | Fed. Rep. of Germany . |
| 2548070 | 1/1985 | France . |
| 58-114842 | 9/1983 | Japan . |

*Primary Examiner*—Joseph Ruggiero
*Attorney, Agent, or Firm*—Hamilton, Brook, Smith & Reynolds

[57] ABSTRACT

A control system for a hydro-mechanically stroked gear shaper provides control and diagnostic functions. The control system includes a video display and a microprocessor. The microprocessor is programmed to monitor load force imparted by a cutting tool over its lifetime. The microprocessor also monitors the number of times a cutting tool is used. By monitoring these parameters, the system provides a indication of when the cutting tool has exceeded its useful life. The control sysem also provides a graphical representation of the gear shaper. When an operational problem is sensed by sensors in the gear shaper, the graphical representation indicates where the problem has arisen.

58 Claims, 7 Drawing Sheets

Microfiche Appendix Included
(80 Microfiche, 1 Pages)

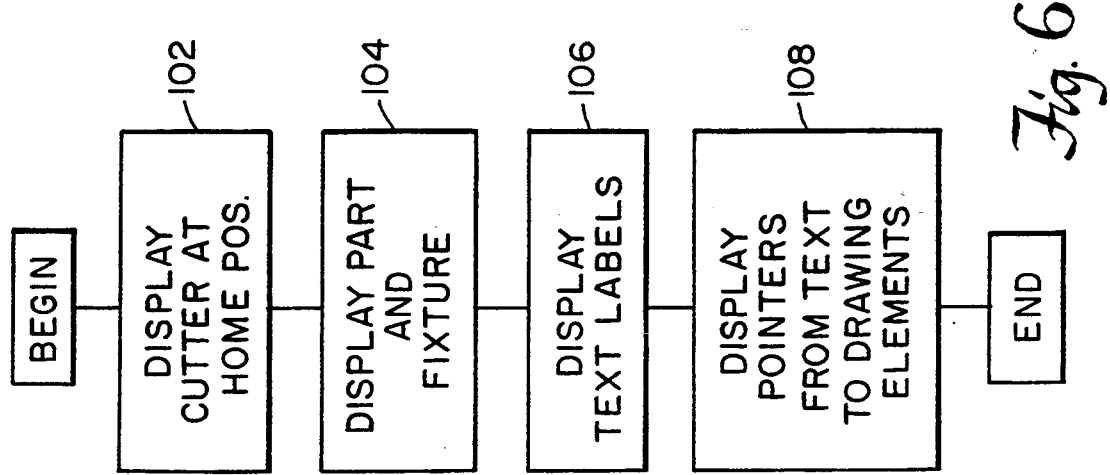
Fig. 6
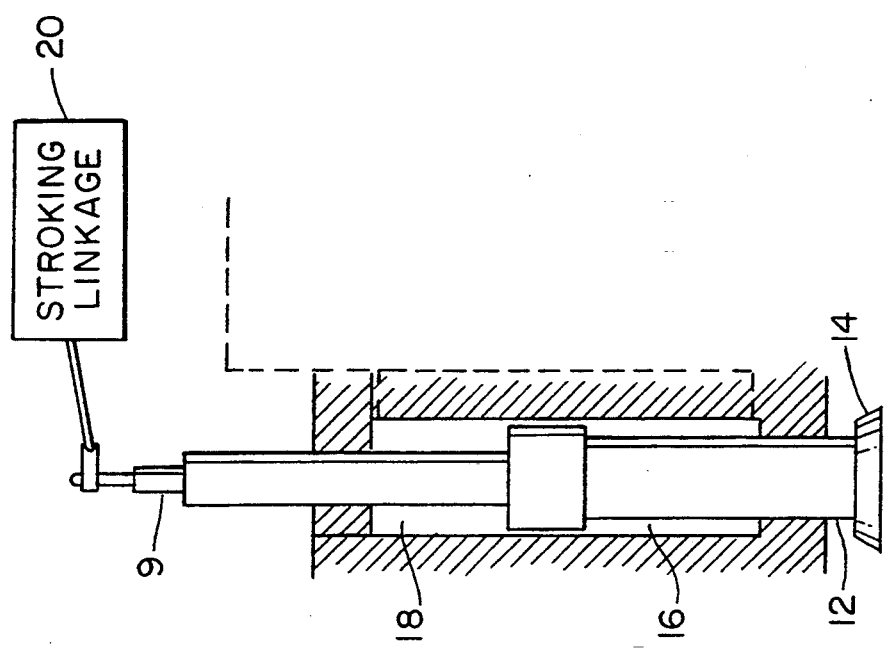
PRIOR ART Fig. 2

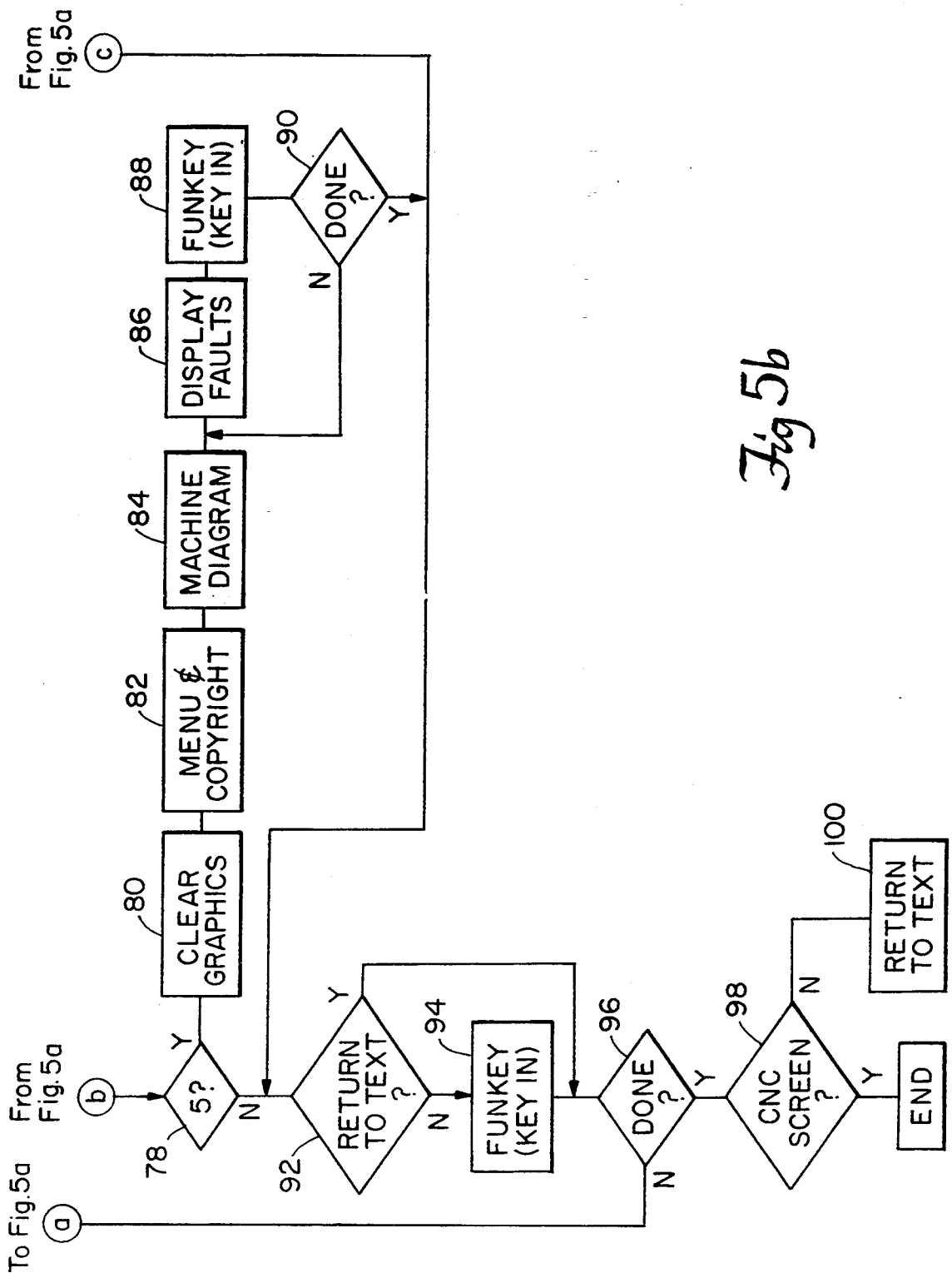

CONTROL GRAPHICS SYSTEM FOR GEAR SHAPING MACHINES

This is a continuation of co-pending application Ser. No. 07/578,421 filed on Sep. 4, 1990 now abandoned.

A portion of the disclosure of this patent document contains material which is subject to copyright protection. The copyright owner has no objection to the facsimile reproduction by any one of the patent disclosure, as it appears in the Patent and Trademark Office files or records, but otherwise reserves all copyright rights whatsoever.

MICROFICHE APPENDIX

A Microfiche Appendix is included in this application. The Appendix includes one microfiche having 80 frames.

BACKGROUND OF THE INVENTION

In mechanically stroked machine tools, a mechanical linkage or other means generates the stroking action of the machine tool. In hydro-mechanically stroked machines, in contrast, a hydraulic system is utilized to generate the stroking action of the machine tool, Such hydro-mechanically stroked machine tools provide many benefits and have proven to be quite desirable.

SUMMARY OF THE INVENTION

In accordance with the present invention, a monitoring system monitors the use of a gear shaper machine tool. The gear shaper is comprised of many components including a cutting tool. The monitoring system has a sensor for measuring the load applied by the cutting tool to a workpiece. The measurements of load taken by the sensor are stored in a memory. Preferably, the memory holds measurements for each use of the cutting tool during the lifetime of the cutting tool. These measurements are used by a processor that processes the measurements of load obtained by the sensor to produce historical information regarding the use of the cutting tool. Typically, the historical information includes an indication of the total load applied by the cutting tool over its lifetime. This total load information can be used to determine whether the current cutting tool should be replaced.

Such a monitoring system is particularly well adapted for a hydro-mechanically stroked cutting system. This monitoring system also monitors the number of times that the cutting tool is used. The total number of uses is kept in memory such that when the count exceeds a predetermined threshold value, the system indicates that the value has been exceeded. Hence, the user of the cutting tool knows that the optimal lifetime of the tool has been exceeded.

The monitoring system of the present invention includes a multi-color video display for displaying video images. It also includes a microprocessor that is programmed to respond to the previously described sensors. In response to these sensors, the microprocessor generates a graphical depiction of the apparatus on the video display. The video display provides two functions: it allows the cutting tool to be used to a predetermined force limit, and if an operational problem arises, an indication of the problem is provided on the graphical depiction of the apparatus.

BRIEF DESCRIPTION OF THE DRAWINGS

FIG. 2 depicts the cutting spindle of the gear shaper apparatus.

FIGS. 5a–5b contain a flow chart of the main procedure of the "graph" program.

FIG. 6 is a flow chart of procedures that are activated when the second soft key is depressed.

DETAILED DESCRIPTION OF THE PREFERRED EMBODIMENT

The preferred embodiment of the present invention concerns a digital control system for monitoring and controlling a machine with a hydromechanically stroked cutting tool. The control system provides unique graphics capabilities and programming features. The control system is particularly well suited for a gear shaper apparatus and, thus, will be described with reference to such an apparatus. It should, nevertheless, be appreciated that the present invention is not limited to a gear shaper apparatus; rather, it encompasses a variety of machine tool systems.

Figure 1:
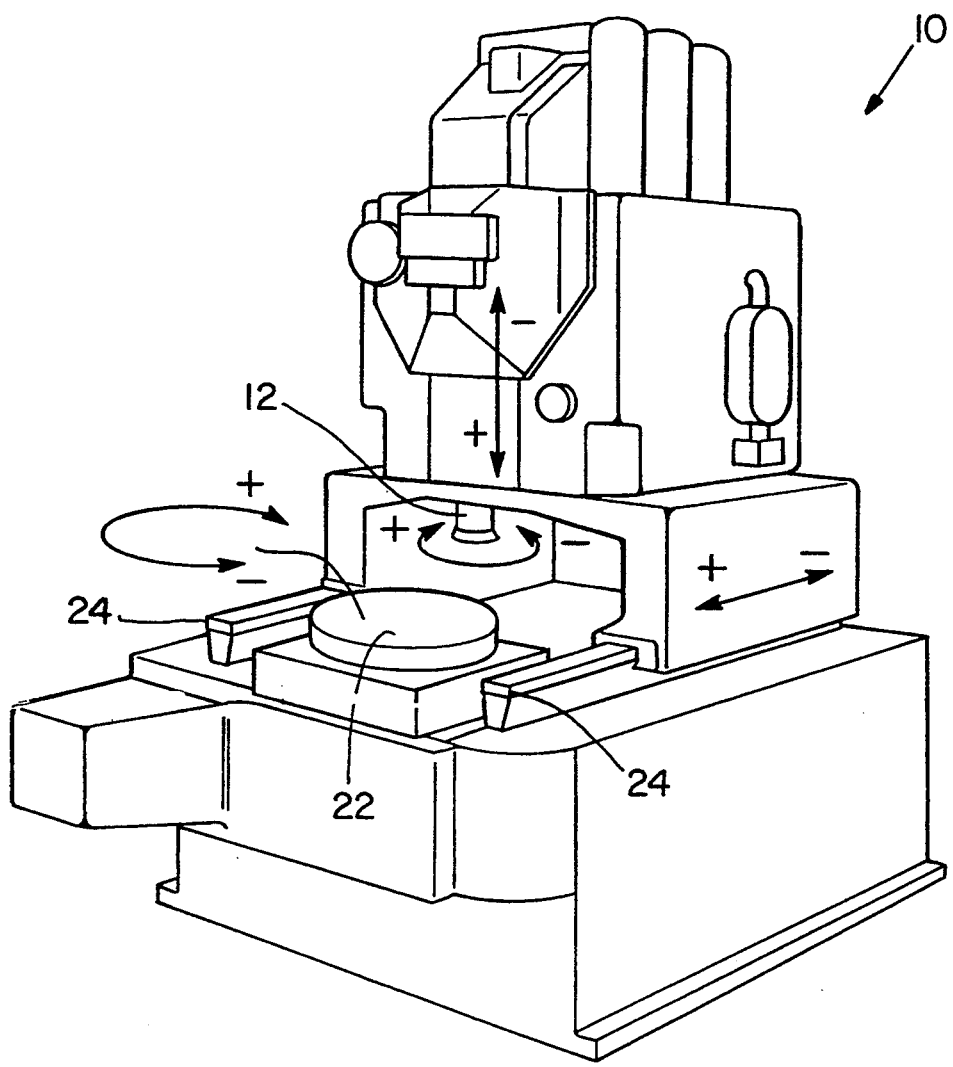
FIG. 1 depicts a gear shaper apparatus.

A gear shaper machine 10 is depicted in FIG. 1. The machine 10 cuts workpieces of material (typically metal) to produce gears. The gear shaper machine 10 has many components including a reciprocating cutting spindle 12. The cutting spindle 12 is shown in more detail in FIG. 2. At the lower end of the cutting spindle 12 is a cutting tool 14. This cutting tool 14 is the mechanism that cuts the workpiece to form a gear. The movement of the cutter spindle 12 is controlled by a hydromechanical system that includes a servo valve 9. The servo valve 9 is part of a servo system that valves hydraulic fluid between a small piston chamber 16, a large piston chamber 18 and a drain. The cutting spindle 12 is slaved to follow the upward/downward motion of the servo valve 9. This servo valve 9 is, in turn, stroked by a stroking linkage 20 driven by a stroking motor.

In addition to the cutting spindle 12, the gear shaper machine includes a workpiece spindle 22 for holding the workpiece. The workpiece spindle 22 is rotatable so that the workpiece may be rotated during the gear shaping process (see arrows in FIG. 1 at the spindle 22). The cutting spindle 12 is also rotatable as indicated by the arrows in FIG. 1. The cutting tool is fed into the workpiece by a feed mechanism. Specifically, the upper portion of the machine is on rails 24 so that it may be moved laterally (see arrows in FIG. 1 on the upper portion) relative to the workpiece. This feed mechanism determines the relationship between the central vertical axes of the workpiece and the cutting tool 14.

The above description of the movement of the gear shaper provides an indication of the six control axes which an operator of the machine can control. Specifically, the operator can control the rotational motion of the workpiece spindle 22 and the rotational motion of the cutting spindle 12. The operator can also control the lateral position of the workpiece relative to the cutting tool via the feed mechanism. Furthermore, an operator can control the stroking speed of the cutting spindle 12 as well as the stroke length of the cutting spindle 12. Lastly, the operator can control elevation of the cutting tool 14 relative to the workpiece surface to be cut.

Figure 3A:
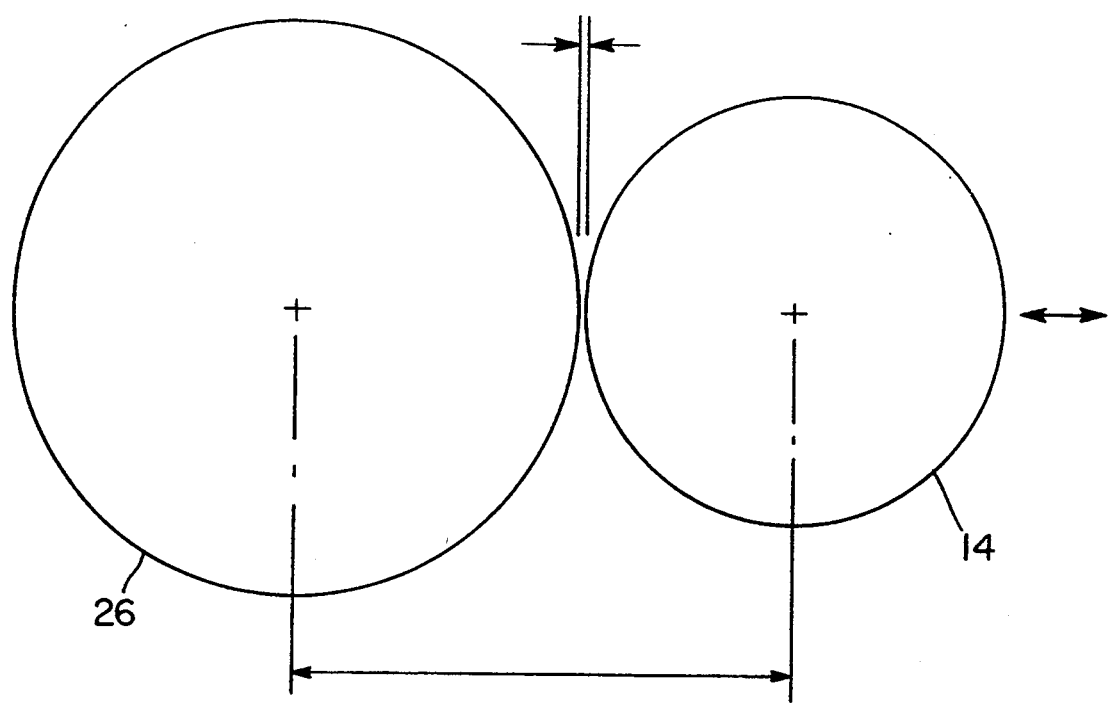
FIGS. 3a and 3b depict operation of the gear shaper cutting tool to produce external spurs on a workpiece.
Figure 3B:
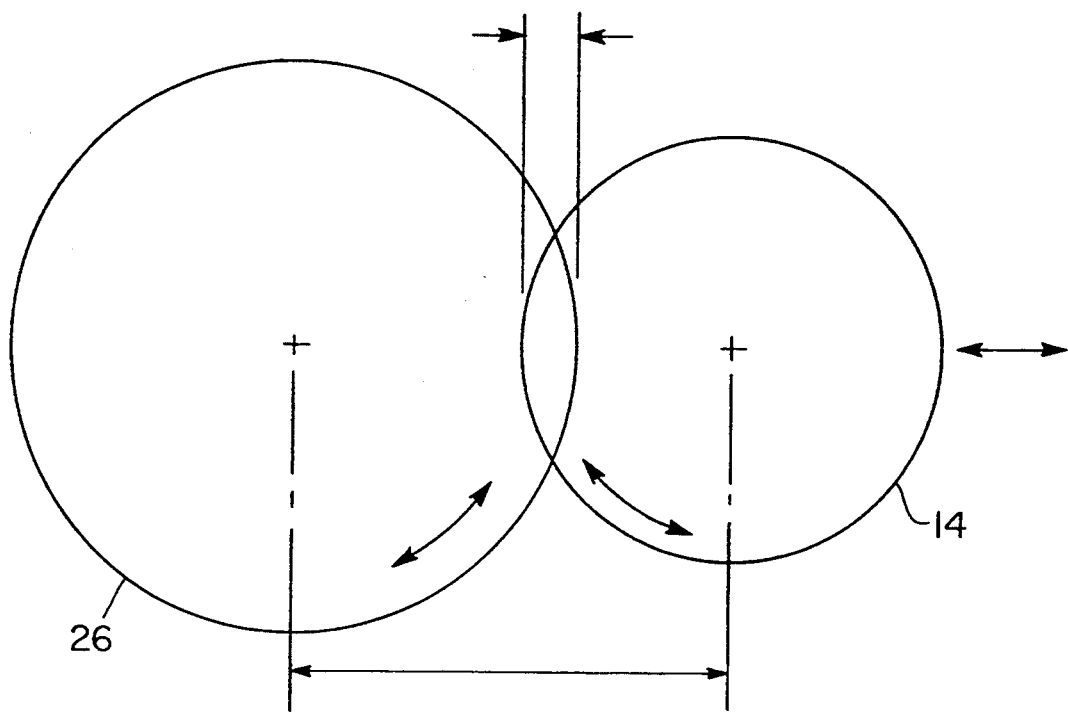

A basic understanding of the gear shaper apparatus 10 may be obtained by examining a typical operation performed by the device. For instance, to create an external spur on a gear, the cutting tool 14 (FIG. 3a) is moved via the above described feed mechanism so that its outer diameter is in close proximity to the workpiece 26. Specifically, the cutting tool 14 is moved close enough to the workpiece 26 so that the outer blades of the cutting tool 14 scratch the outer diameter of the workpiece 26. The scratch marks on the outer diameter of the workpiece 26 indicate positions where cuts will be made. The operator uses these marks to properly position the system so that it is read to cut the gear. Once the machine is properly positioned, cutting begins. Typically, both the cutting tool 14 and the workpiece 26 are rotated during the cutting process. Cutting is effected by moving the cutting tool 14 towards the workpiece 26. As time progresses, the cutting tool 14 and the workpiece 26 are moved closer together so that deeper cuts are realized. During the cutting process, the cutting tool 14 is moved upwards and downwards relative to the workpiece 26 to cut into in the workpiece. The cut depth is gradually increased until the final depth is reached. At that point, the depth feed ceases. The rotary feed continues until the workpiece has rotated a preset amount. This final position of the cutting tool 14 and workpiece 26 is depicted in FIG. 3b.

Additional discussion of such a gear shaper apparatus is provided in U.S. Pat. No. 4,254,690 issued to Tlaker et al., in U.S. Pat. No. 4,542,638 issued to Tlaker and U.S. Pat. No. 4,533,858 issued to Tlaker, all of which are incorporated herein by reference.

Figure 4:
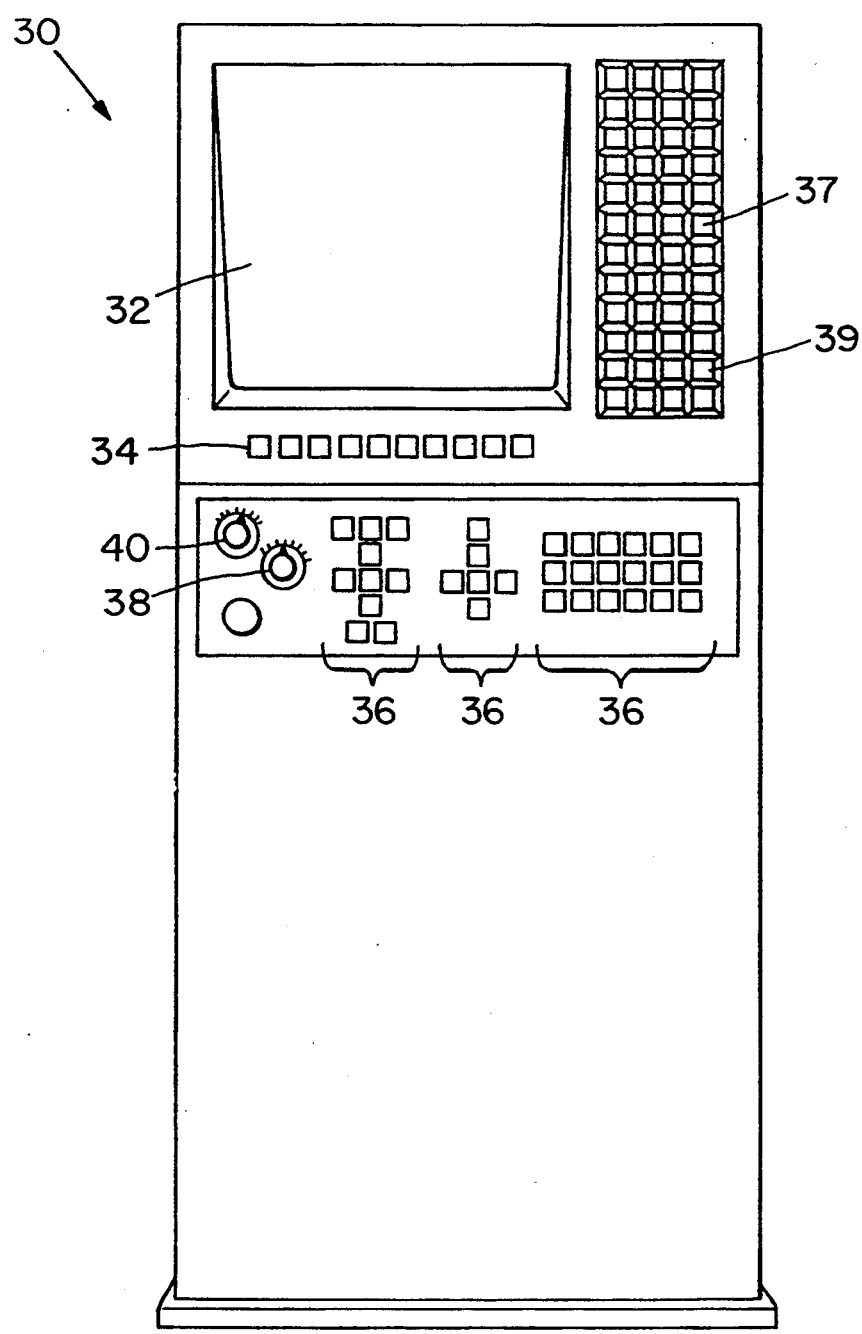
FIG. 4 is a depiction of the control system of the present invention.

The control system 30 (FIG. 4) monitors and controls operation of the gear shaper apparatus 10. Specifically, it provides a number of diagnostic signals and control capabilities that are useful to an operator of the gear shaper apparatus. The control system is equipped with video display to provide useful information to the user of the machine in video form. Both diagnostic information and control information are shown on the video display.

The control system 30 stands as a separate unit apart from the gear shaper 10. It is interfaced with the gear shaper to regulate the gear shaper's operation. The control system 30 provides a number different types of user interfaces. As mentioned above, the control system 30 includes a video display 32. Also provided are a number of programmable keys referred to as soft keys 34. These keys 34 may be programmed to perform different functions that interact with information being displayed on the video. Examples of functions which the keys 34 perform will be described below. The control system 30 also includes push buttons 36 that enable the user to execute certain activities by depressing them. A light is provided in the upper left corner of each push button 36 to indicate whether the function associated with the push button 36 has been activated or not. A final set of keys 37 are provided for data entry, editing, and text.

The control system 30 additionally includes several manual control knobs. In particular, a feed override knob 38 is provided to allow the operator to change the speed of a selected axis of motion described above from 0 to 100% of the commanded speed. The other manual control knob is a manual pulse generator 40. The manual pulse generator allows the movement of a selected axes by use of a handwheel. The manual pulse generator 40 will be described in more detail below, In general, the gear shaper 10 operates in automatic mode. In this mode, a microprocessor in the control system 30 dictates activity of the gear shaping apparatus. It is often desirable to provide various manual override features that override automatic operation of the apparatus. These features are implemented in the manual controls briefly described above.

To understand the role of the manual controls, it is necessary first to understand the environment of the gear shaping apparatus. The dimensions of the cutting head and other parts on a gear shaper apparatus will vary from machine to machine. In particular, the cutting tool outer diameter may vary by 1000th's of an inch amongst cutting tools. Furthermore, the workpiece will vary relative to other like workpieces in its various dimensions. Still further, each machine differs slightly in its motion. Before an operator begins cutting a group of parts, the operator needs to know these variances. To that end, the scratching procedure described previously is utilized to discern where the cuts will be made on the workpiece. This process is very difficult to perform with prior art systems because such systems could not be moved with great precision. With the present invention, in contrast, such precision can be readily achieved. Specifically, the manual pulse generator enables an individual to move the relative position of the cutter and the gear assembly by one ten thousandth of an inch at a time.

The manual pulse generator 40 is a knob having a 100 increments on it. Each increment comprises one ten thousandth of an inch. It should be noted that this motion is not limited to a single axis of motion but can be selected for any machine axis. For instance, it can be utilized on the stroke axis as well as the feed axis.

The control system 30 uses a G. E. Fanuc, model 15 control system (produced by G. E. Fanuc Automation Systems). The control system, however, builds on the Fanuc model 15 foundation to produce several features described herein. This system is provided with the PMC model N Pascal language software package. The details of this software package are described in the manual entitled, "PMC Model N Pascal Language Programming," G. E. Fanuc Automation Systems part No. GFZ61013E102. The present invention, however, also includes additional software such as that provided in the Microfiche Appendix. The additional software provides control monitoring and graphics capabilities not available with the Fanuc model 15.

To understand how the additional software operates, it is necessary to first understand the interface between the Fanuc model 15 software and the additional software. The Fanuc model 15 is provided with software that can perform basic control functions for a machine tool system. The software generates a number of screen displays that allow the user of the system to interact with the system. The additional software runs within this Fanuc model 15 environment.

Initially, when the control system 30 is operating, the screen of the video display 32 will show a display generated by the G. E. Fanuc model 15 software. To gain access to screens provided by the present invention, the operator depresses a key 39 located on the righthand side of the front face of the control system 30. Upon depression of the key 39 a menu is revealed on the screen. The menu gives a user of the control system 30 several options that he can pursue. To pursue an option, the user depresses a soft key 34 associated with the option. The menu is such that it makes clear which option is associated with a particular soft key. The options available for this menu are as follows. If the second key is depressed a wire frame drawing of the cutter, workpiece and fixture will be shown. If the third soft key is depressed, a graphics demonstration takes place. Specifically, a brief animation sequence is displayed. If the fourth soft key is depressed, text screens are called. The text screens provide a textual display in which data can be entered and edited using keyboard 37.

Depression of the fifth key displays a wire frame diagram of the gear shaper apparatus. The diagram will remain until a different function is selected. Once this screen is selected, if any machine fault occurs, a switch or a sensor designation is placed on the machine diagram indicating the approximate location of the faulty component of the machine. When the fault is remedied, the fault indicator is cleared. This provides a easily recognizable means for locating the cause of faults and provides real time knowledge of such faults. Depression of the sixth key results in exiting to the screens provided by the Fanuc model 15 software.

Figure 5A:
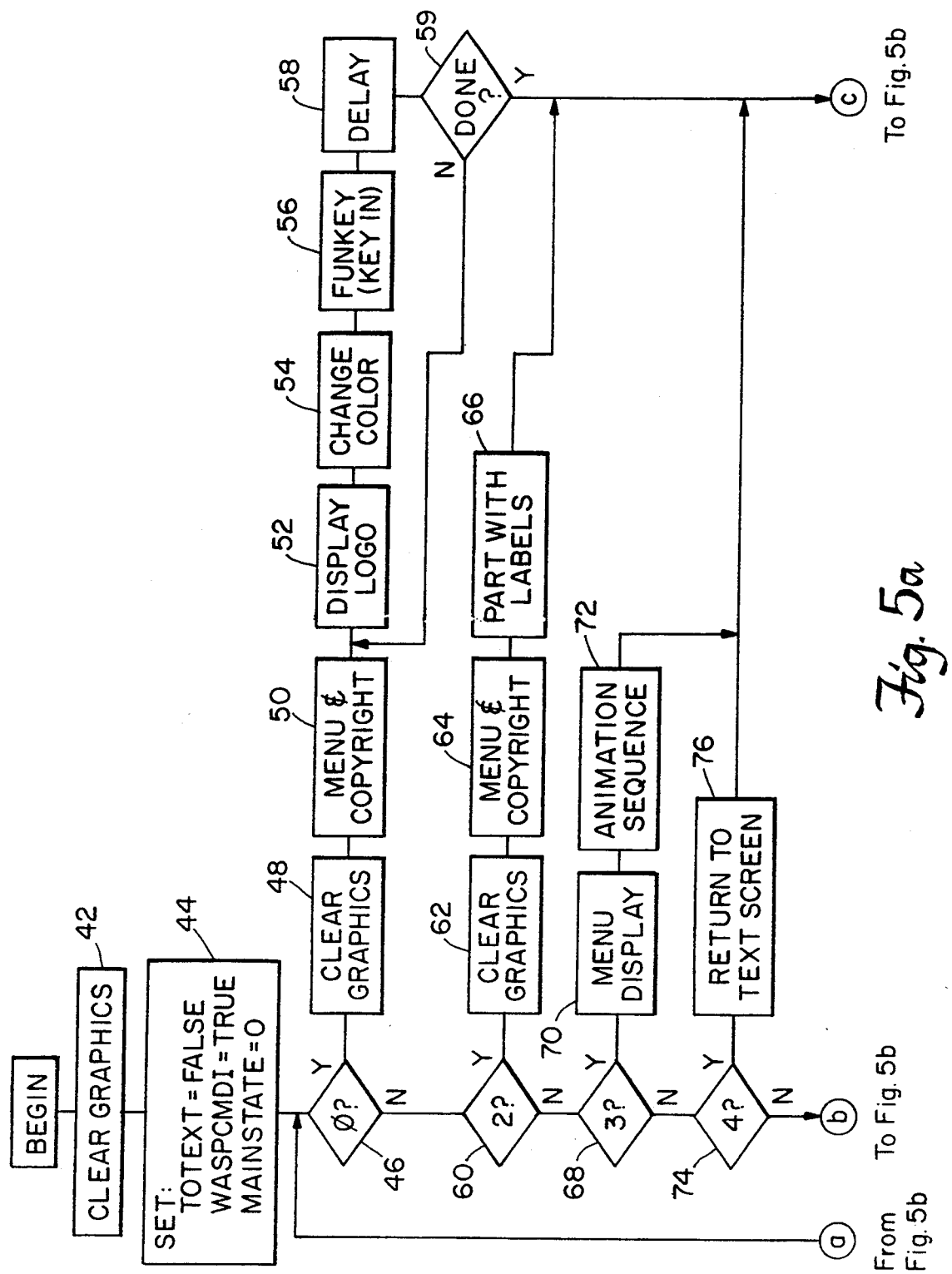

These options are implemented by the program "graph" which is listed in the Microfiche Appendix. A flow chart of the main body of "graph" is provided in FIGS. 5a–5b. As the flowchart reveals, the first step of the program is to clear the graphics screen (step 42). Next, the program initializes a number of variables (step 44). The variable "mainstate" indicates which soft key is depressed and initially has a value of zero.

The system first checks to see if "mainstate" equals zero (step 46). If "mainstate" equals zero, the screen is cleared (step 48) and a menu and copyright notice are displayed (step 50). The menu and copyright notice are generated by procedures listed in the attached Microfiche Appendix. Next, a logo is displayed (step 52), the color of the screen is changed (step 56), and the system waits for a menu selection to be made with the soft keys (steps 56, 58 and 59). This is the state that the system will remain in until a selection is made.

If the second soft key is depressed (step 60) the graphics screen is cleared (step 62), and a menu and copyright notice are displayed (step 64). The system then calls a sequence of procedures (step 66). A flowchart of the sequence of these procedures is provided in FIG. 6. First, the procedure "cutter" is called which displays a representation of the cutting tool at its home position (step 102). Next, the procedure "partfix" is called (step 104). This procedure displays a workpiece and a fixture. After that procedure is completed the "showtext" procedure is called (step 106). The "showtext" procedure displays textual labels for the displayed that is displayed. Lastly, the procedure "arrows" is called (step 108). "arrows" displays arrows connecting the labels to the elements of the depicted workpiece. All of these procedures are listed in the Microfiche Appendix.

If the third soft key is depressed (step 68 in FIG. 5a), a menu is displayed (step 70), and an animation sequence is initiated (step 72). If the fourth soft key is depressed (step 74), the system display changes to the text screens (step 76). Lastly, if the fifth soft key is depressed (step 78), the screen is cleared (step 80). Once the screen has been cleared, the menu and copyright notice are displayed (step 82). Then, the previously described outline or wire frame of the machine is displayed (step 84). Any faults that arise are displayed (step 86). Otherwise, the display keeps the diagram in view until a different function is selected (steps 88 and 90).

From the program "graph", one can exit to text mode. In particular, the program checks to see if the operator wishes to exit to the text screens (step 92). If not, the program waits for an option to be selected (step 94). When through with these steps (step 96), the user can change to the screen which displays information generated by a given microprocessor or it can return to the text screens.

As mentioned above, the depression of the fifth softkey produces a wire frame diagram of the gear shaper apparatus with any faults being indicated at appropriate locations on the wire frame diagram. This graphical approach provides a very useful and easily comprehended tool. It enables the operator to quickly identify the exact cause of a problem. To provide this information, various sensors are positioned throughout the gear shaper apparatus. The sensors are interfaced with a microprocessor that monitors the switches to determine if a fault or error has occured.

The sensors used in the gear shaper are as follows. A first sensor acts as a hydraulic float within the hydraulic fluid reservoir for the hydraulic system. It floats in the hydraulic reservoir such that when the level is too low, the float completes a magnetic contact indicating that the hydraulic fluid level is too low. A sensor is also provided for monitoring hydraulic fluid temperature. The temperature sensor is a diaphragm type device that expands with increasing temperature. When the threshold temperature is reached, the diaphragm makes contact with a switch. A third sensor monitors low accumulator precharge pressure level. This sensor is a diaphragm pressure switch.

A number of mechanical plunger switches are provided. Specifically, a front splash guard switch indicates the opened or closed condition of the front splash guard. Likewise, there is a rear splash guard switch which indicates the opened or closed state of the rear splash guard. Lastly, a mechanical plunger switch is used for monitoring the change gear door.

A sensor is also provided to indicate when the coolant level is too low for proper machine operation. This sensor is like the float sensor referred to above for the hydraulic fluid level. Further, a stroke door switch is provided to indicate when the stroke mechanism door is open. This switch, like the change gear door switch, is a mechanical plunger type switch.

Other switches provided within the present invention include a fixture pressure switch. This switch indicates that there is an insufficient hydraulic pressure to securely clamp the fixture. This is a diaphragm type pressure sensor. Also included is a top of stroke switch. This switch indicates that the hydro-mechanically stroked cutting tool is at the top of its stroking position. The position of the tool at the top of stroke position is required for certain machine operations. This sensor is implemented using an inductive proximity type switch. It generates a signal correlated with the proximity of a steel object.

To ensure safe operation of the motor, a motor overload switch is provided. This switch indicates that the motor has drawn too much current and has thus, been shut down. The motor overload switch utilizes a set of thermal contacts. The thermal contacts are placed in series with the coils of the motor. If the motor consumes excessive current, the thermal contacts heat and expand so that they complete the contact. The contact, in turn, de-energizes the motor. Mechanical plunger switches and hydraulic pressure switches are mounted to the hydraulic fluid filters to provide a contact closure indicating contamination.

The sensors of the present invention also include 5 transducers. In particular, a hydraulic pressure transducer is utilized. This transducer generates a signal which is converted to digital data by an analog/digital converter. It monitors hydraulic pressure and can be used to determine insufficient or excessive supply pressure. A second transducer is utilized in much the same manner as the first hydraulic pressure transducer. The difference lies in that the second transducer monitors the cutting load to compare for excessive load. This transducer as well as the previously described transducer are capacitive transducers.

Figure 7:
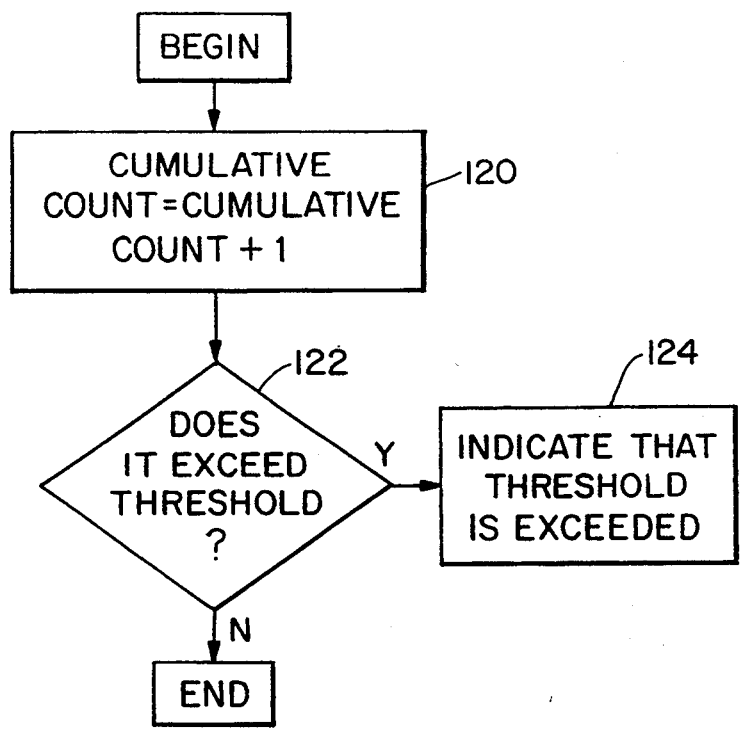
FIG. 7 is a flow chart of the load monitoring process.

A final sensor provided in the present invention is the tool change counter. The tool change counter is a software counter that indicates when the cutting tool on the machine has exceeded its predetermined usable life and should be replaced. A flowchart of the counter's operation is provided in FIG. 7. Specifically, this counter counts the number of times that the cutting tool has been used (step 120). If the number of uses exceeds a predetermined threshold (step 122), the counter indicates that a new tool is necessary (step 124).

Figure 8:
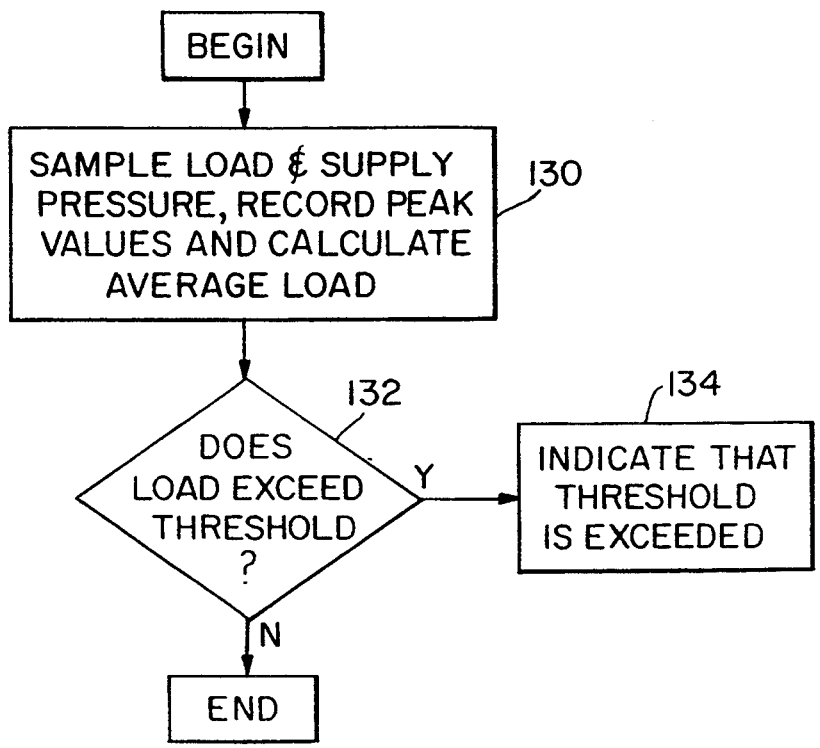
FIG. 8 is a flow chart of the monitoring of the use of a cutting tool.

Software mechanisms are also utilized to keep tabs on the cutting load applied over the lifetime of a tool. The present invention keeps track of the data derived from the hydraulic pressure transducer for cutting load and stores this data in a memory. A flowchart of this process is shown in FIG. 8. Data is accumulated to establish the trend of change in cutting force due to wear of the cutting tool through extended usage. The trend can be based on either the average force experience while cutting the workpiece, or upon the peak force experienced (step 130). When the value exceeds the predetermined threshold (step 132) an indication is made to the operator that the threshold has been exceeded (step 134). As such, the use of the device can be optimized so that it is not utilized for too short or too long of a period of time.

The monitoring of the load applied by the cutting tool is also useful in providing real time indication of changes in the cutting tool. By providing this immediate feedback in real time, an operator of the gear shaper can alter the load pressure so that it is better suited for a particular gear shaping operation. Such an ability to provide feedback on the fly enables the gear shaper apparatus to achieve higher levels of precision as well as to optimize performance of the tool.

The control system of the present invention uses four microprocessors. A first microprocessor commands motion of the axes of the machine. It is utilized to properly position the motion parameters of the device. It is a Motorola 68020 microprocessor. This microprocessor is also used to control the position screens of the control system. These control screens allow adjustment of the control axes and are provided by the Fanuc software. A second microprocessor sequences machine operations and interfaces the control panel to the machine. Further, it executes the text screens and graphics screens embodied in the Pascal code of the Microfiche Appendix. This second microprocessor is of primary interest in the present invention. It may may be implemented using a Motorola 68000 chip.

A third microprocessor is a single bit microprocessor, the role of which is not especially relevant to the current discussion. The fourth and final microprocessor is utilized for sampling of supply and load pressure transducers, conversion of analog voltages to digital values, and control of the hydraulic pressure supplied to the machine.

The Fanuc model 15 control system has two serial ports. Port A is dedicated to the external connector for use with devices such as a printer, a floppy disk drive, a thin card reader or with another external computer. The second serial port, port B, is dedicated to communication with the fourth microprocessor described above. As options, two additional serial ports may be added. This capability boosts the ability of the control system to provide important information and data to the operator of the system.

While the invention has been particularly shown and described with reference to preferred embodiments thereof, it will be understood by those skilled in the art that various changes in form and details may be made without departing from the spirit and scope of the invention as defined in appended claims.

We claim:

1. A monitoring system for monitoring use of a gear shaper apparatus having a cutting tool rotatable about a spindle axis and reciprocable along said spindle axis, said monitoring system comprising:
   a) a sensor for measuring an amount of load applied by the cutting tool of the gear shaper apparatus during each of a plurality of workpiece cutting operations in which a plurality of workpieces are cut with the cutting tool;
   b) a memory for storing measurements of load applied by the cutting tool as obtained by the sensor over time during each cutting operation of the gear shaper apparatus for the plurality of workpieces; and
   c) a processor for processing the measurements of load obtained by the sensor and held in the memory to accumulate historical information regarding use of the cutting tool, said accumulated historical information being based on load measurements obtained during the plurality of cutting operations.

2. A monitoring system as recited in claim 1 wherein the memory holds measurements of load applied by the cutting tool for a time frame elapsing between a first use of the cutting tool and a most recent use of the cutting tool.

3. A monitoring system as recited in claim 1 wherein the historical information comprises an indication of load trends over the life of the cutting tool.

4. A monitoring system as recited in claim 1 wherein the historical information indicates whether the cutting tool should be replaced with a new cutting tool.

5. A monitoring system as recited in claim 1 wherein the cutting tool is coupled to a hydro-mechanically stroked cutting spindle.

6. A method of optimizing use of a cutting tool in a gear shaper apparatus, said cutting tool being rotatable about a spindle axis and reciprocable along said axis, said method comprising the steps of:
   a) measuring a load applied by the cutting tool for each of a plurality of cutting operations of the cutting tool in which a plurality of workpieces are cut with the cutting tool;
   b) accumulating the measurements of load applied by the cutting tool over the plurality of cutting operations to establish historical information based on measurements of load obtained during the plurality of cutting operations; and c) replacing the cutting tool when the historical information indicates that the total accumulated cutting tool load exceeds a predetermined value.

7. A method of monitoring use of a cutting tool of a gear shaper apparatus, comprising the steps of:

sensing the application of a load by the cutting tool on a workpart, said load application defining a use of the cutting tool;

maintaining a count of how many times the cutting tool has been used;

storing the count in a memory;

indicating to a user of the gear shaper apparatus when the count exceeds a specific value so that the user knows that the cutting tool needs to be replaced.

8. A method as recited in claim 7 wherein the cutting tool is hydro-mechanically stroked.

9. A monitoring system for monitoring operation of a gear shaper apparatus in real time comprising:

a) a video display;

b) sensors positioned on the gear shaper apparatus to physically sense present operating conditions of the gear shaper apparatus as the gear shaper apparatus operates; and c) a microprocessor programmed to receive indications of the physically sensed present gear shaper apparatus operating conditions, to generate a graphical depiction of the gear shaper apparatus on the video display and to presently indicate on said graphical depiction the physically sensed conditions of the gear shaper apparatus.

10. A monitoring system as recited in claim 9 wherein the graphical depiction of the apparatus is an outline of the apparatus.

11. A monitoring system as recited in claim 9 wherein the gear shaper apparatus is a hydro-mechanically stroked apparatus.

12. The monitoring system of claim 9 wherein the operating conditions sensed are selected from the group comprising hydraulic fluid reservoir fluid level, hydraulic fluid temperature, accumulator precharge pressure level, front splash guard position, rear splash guard position, change gear door position, coolant level, stroke door position, fixture pressure, stroke position, motor overload, hydraulic fluid filter contamination and hydraulic fluid supply pressure.

13. The monitoring system of claim 9 wherein the operating conditions sensed comprise hydraulic fluid reservoir fluid level.

14. The monitoring system of claim 9 wherein the operating conditions sensed comprise hydraulic fluid temperature.

15. The monitoring system of claim 9 wherein the operating conditions sensed comprise accumulator precharge pressure level.

16. The monitoring system of claim 9 wherein the operating conditions sensed comprise front splash guard position.

17. The monitoring system of claim 9 wherein the operating conditions sensed comprise rear splash guard position.

18. The monitoring system of claim 9 wherein the operating conditions sensed comprise change gear door position.

19. The monitoring system of claim 9 wherein the operating conditions sensed comprise coolant level.

20. The monitoring system of claim 9 wherein the operating conditions sensed comprise stroke door position.

21. The monitoring system of claim 9 wherein the operating conditions sensed comprise fixture pressure.

22. The monitoring system of claim 9 wherein the operating conditions sensed comprise stroke position.

23. The monitoring system of claim 9 wherein the operating conditions sensed comprise motor overload.

24. The monitoring system of claim 9 wherein the operating conditions sensed comprise hydraulic fluid filter contamination.

25. The monitoring system of claim 9 wherein the operating conditions sensed comprise hydraulic fluid supply pressure.

26. The monitoring system of claim 9 wherein the operating conditions sensed comprise cutting load.

27. A method of monitoring operation of a gear shaper apparatus to locate faults in real time, said method comprising the steps of:

providing a graphical depiction of the gear shaper apparatus on a video display;

physically sensing present operating conditions of the gear shaper apparatus as the gear shaper apparatus operates; and presently displaying an indication of the physically sensed present conditions of the gear shaper apparatus on the graphical depiction of the gear shaper apparatus such that the indication indicates the location of the fault on the gear shaper apparatus.

28. A method as recited in claim 27 wherein the graphical depiction of the gear shaper apparatus is an outline of the gear shaper apparatus.

29. The method of claim 27 wherein the operating conditions sensed are selected from the group comprising hydraulic fluid reservoir fluid level, hydraulic fluid temperature, accumulator precharge pressure level, front splash guard position, rear splash guard position, change gear door position, coolant level, stroke door position, fixture pressure, stroke position, motor overload, hydraulic fluid filter contamination and hydraulic fluid supply pressure.

30. The method of claim 27 wherein the operating conditions sensed comprise hydraulic fluid reservoir fluid level.

31. The method of claim 27 wherein the operating conditions sensed comprise hydraulic fluid temperature.

32. The method of claim 27 wherein the operating conditions sensed comprise accumulator precharge pressure level.

33. The method of claim 27 wherein the operating conditions sensed comprise front splash guard position.

34. The method of claim 27 wherein the operating conditions sensed comprise rear splash guard position.

35. The method of claim 27 wherein the operating conditions sensed comprise change gear door position.

36. The method of claim 27 wherein the operating conditions sensed comprise coolant level.

37. The method of claim 27 wherein the operating conditions sensed comprise stroke door position.

38. The method of claim 27 wherein the operating conditions sensed comprise fixture pressure.

39. The method of claim 27 wherein the operating conditions sensed comprise stroke position.

40. The method of claim 27 wherein the operating conditions sensed comprise motor overload.

41. The method of claim 27 wherein the operating conditions sensed comprise hydraulic fluid filter contamination.

42. The method of claim 27 wherein the operating conditions sensed comprise hydraulic fluid supply pressure.

43. The method of claim 27 wherein the operating conditions sensed comprise cutting load.

44. A monitoring system for monitoring use of a gear shaper apparatus having a cutting tool, comprising:
- a sensor for measuring hydraulic pressure to determine an amount of load applied by the cutting tool of the gear shaper apparatus during each of a plurality of workpiece cutting operations in which a plurality of workpieces are cut with the cutting tool;
- a memory for storing measurements of load applied by the cutting tool as obtained by the sensor over time during each cutting operation of the gear shaper apparatus for the plurality of workpieces; and
- a processor for processing the measurements of load obtained by the sensor and held in the memory to accumulate historical information regarding the use of the cutting tool, said accumulated historical information being based on load measurements obtained during the plurality of cutting operations.

45. The monitoring system of claim 44 further comprising a display for displaying real time indications of the measured load as the load is applied by the cutting tool.

46. The monitoring system of claim 45 wherein the display displays a graphical representation of the gear shaper apparatus.

47. The monitoring system as recited in claim 44 wherein the memory holds measurements of load applied by the cutting tool for a time frame elapsing between a first use of the cutting tool and a most recent use of the cutting tool.

48. A monitoring system as recited in claim 44 wherein the historical information comprises an indication of load trends over the life of the cutting tool.

49. A monitoring system as recited in claim 44 wherein the historical information indicates whether the cutting tool should be replaced with a new cutting tool.

50. A monitoring system as recited in claim 44 wherein the cutting tool is coupled to a hydro-mechanically stroked cutting spindle.

51. A monitoring system for monitoring use of a gear shaper apparatus having a cutting tool, comprising:
- a sensor for measuring an amount of load applied by the cutting tool of the gear shaper apparatus during each of a plurality of workpiece cutting operations in which a plurality of workpieces are cut with the cutting tool;
- a memory for storing measurements of load applied by the cutting tool as obtained by the sensor over time during each cutting operation of the gear shaper apparatus for the plurality of workpieces;
- a processor for processing the measurements of load obtained by the sensor and held in the memory to accumulate historical information regarding use of the cutting tool, said accumulated historical information being based on load measurements obtained during the plurality of cutting operations; and
- a display for displaying real time indications of the measured load as the load is applied by the cutting tool.

52. The monitoring system of claim 51 wherein the sensor senses hydraulic fluid pressure.

53. The monitoring system of claim 51 wherein the display displays a graphical representation of the gear shaper apparatus.

54. The monitoring system as recited in claim 51 wherein the memory holds measurements of load applied by the cutting tool for a time frame elapsing between a first use of the cutting tool and a most recent use of the cutting tool.

55. The monitoring system as recited in claim 51 wherein the historical information comprises an indication of load trends over the life of the cutting tool.

56. A monitoring system as recited in claim 51 wherein the historical information indicates whether the cutting tool should be replaced with a new cutting tool.

57. A monitoring system as recited in claim 51 wherein the cutting tool is coupled to a hydro-mechanically stroked cutting spindle.

58. A monitoring system for indicating faults in a gear shaper apparatus in real time, comprising:
- a video display;
- sensing means positioned on the gear shaper apparatus for physically sensing present conditions of the gear shaper apparatus as the gear shaper apparatus operates; and
- a microprocessor programmed to receive indications of the physically sensed present gear shaper apparatus condition and to generate a graphical depiction of the apparatus on the video display, said graphical depiction indicating where on the apparatus faults exist.

* * * * *